Dec. 25, 1962     G. H. RAWCLIFFE     3,070,734
ROTARY ELECTRIC MACHINES Filed Sept. 28, 1960     8 Sheets-Sheet 1

Fig. 1(a).
PARALLEL-STAR
(UNMODULATED)

Fig. 1(b).

Fig. 2(a).
SERIES - STAR
(MODULATED)

Fig. 2(b).

INVENTOR
Gordon Hindle Rawcliffe
BY
Stevens, Davis, Miller + Mosher
ATTORNEYS

Dec. 25, 1962  G. H. RAWCLIFFE  3,070,734
ROTARY ELECTRIC MACHINES
Filed Sept. 28, 1960  8 Sheets-Sheet 3

Fig.5.

INVENTOR
Gordon Hindle Rawcliffe
BY
Stevens, Davis, Miller & Mosher
ATTORNEYS

Dec. 25, 1962 G. H. RAWCLIFFE 3,070,734
ROTARY ELECTRIC MACHINES
Filed Sept. 28, 1960 8 Sheets-Sheet 8

SERIES — STAR (UNMODULATED)
10 POLES

PARALLEL-STAR (MODULATED)
4 POLES

INVENTOR
Gordon Hindle Rawcliffe
BY
Stevens, Davis, Miller + Mosher
ATTORNEYs

United States Patent Office 3,070,734
Patented Dec. 25, 1962

3,070,734
ROTARY ELECTRIC MACHINES
Gordon Hindle Rawcliffe, Clifton, Bristol, England, assignor to National Research Development Corporation, London, England
Filed Sept. 28, 1960, Ser. No. 59,071
Claims priority, application Great Britain Oct. 16, 1959
8 Claims. (Cl. 318—224)

This invention relates to rotary electric machines and particularly to three-phase squirrel cage induction motors having a running speed which may be varied continuously.

Induction motors are known having separate windings providing alternative pole-numbers and therefore alternative speeds when either one or other of the windings is energised. Since only one of the two windings is used at either speed, such motors are obviously uneconomical. However, close ratios of alternative speeds are possible with such machines.

Pole-changing squirrel cage induction motors are also known having phase-winding switching arrangements by means of which alternative numbers of poles are provided by means of a single winding. Such motors may then be operated at alternative fixed speeds related to each other inversely as the pole-numbers provided. Such alternative pole numbers and speeds are commonly in the ratio of 2:1 or 3:1.

Recently, a more sophisticated method of pole-changing has been devised and is known as "pole amplitude modulation." This method, in one of its forms, is described in a paper by Professor G. H. Rawcliffe, R. F. Burbidge and W. Fong, "Induction-Motor Speed-Changing by Pole-Amplitude Modulation," published in Proc. I.E.E., vol. 105, part A, No. 22, August 1958, page 411 et seq.

The method described in this paper relates to windings for alternative pole-numbers neither of which is a multiple of three. In such cases all three phase-windings are similarly modified for pole-amplitude modulation.

It is possible to apply the method of pole-amplitude modulation to windings for alternative pole-numbers one of which is a multiple of three, but two of the three phase-windings require to be modified in a more complicated manner. In such cases, one of the phase-windings is modified exactly as explained in the paper referred to above. The coils of the other two phase-windings are considered as though divided into two components, which form respectively one-third and two-thirds of each coil and are spaced from each other by one pole-pitch. The same modulating pattern which was applied to the coils of the first phase-winding is applied to both the said components of the second and third phase windings to provide a resultant modulation pattern which is substantially the same for all three phases.

An operating circuit arrangement has now been devised, for machines having alternative pole-numbers by pole-amplitude modulation, which enables the single winding to be energised simultaneously in the two ways formerly regarded as alternatives, and described as such in the technical paper referred to. This novel operating circuit thus permits of producing rotating fields of two pole-numbers simultaneously, the one pole-number being the basic pole-number for which the winding is constructed and the second being the alternative pole-number provided by pole-amplitude modulation.

Furthermore, by continuous variation of the relative energisation of the winding by the two modes, the operating speed can be varied continuously between the two limiting speeds corresponding to the two pole-numbers.

So far as the present invention is concerned, a machine providing two alternative pole numbers by the method of pole-amplitude modulation is regarded simply as a two-speed, three-phase machine having six terminals fed in alternative groups of three to provide the alternative speeds.

An understanding of the theory of pole-amplitude modulation is not necessary for an understanding of the present invention. How the present invention may be carried into practical effect is fully explained by examples herein. Reference to the said technical paper is given solely for the purpose of explaining why the invention operates in the way described.

The present invention provides a control circuit arrangement for controlling the speed of a three-phase, pole-changing motor, said motor having three phase-windings for providing a first pole-number when energised in a first manner and for providing a second pole-number by pole-amplitude modulation when energised in a second manner, at least the major part of each of said three phase-windings comprising two groups of series-connected coils connected from separate end terminals to a common mid terminal, said first and second manners of energisation comprising series-connection and parallel-connection respectively of said two groups of coils of each phase-winding, supply connections from a first three-phase supply to said mid terminals of the three phase-windings, supply connections from a second three-phase supply to said end terminals of the three phase-windings and control means for simultaneously and oppositely varying the amplitudes of said first and second three-phase supplies.

One form of the invention provides such a control circuit arrangement in which said supply connections from said first three-phase supply includes coils of the three phase-windings not included in said two series-connected groups.

The supply connections from the second three-phase supply may include a three-phase transformer. In such case, each secondary winding is conveniently connected to the end terminals of one phase-winding. Further, the secondary windings may be centre tapped and joined at the centre taps.

The centre points of the three centre-tapped secondary windings, when connected together, provide the centre point of a parallel-star connection of the phase-windings.

The primary windings of the three-phase transformer may be connected either in star or in delta. The three secondary windings provide, at their extremities, the three phases required for energisation of the phase-windings with the two coil groups in series. When the phase-windings are supplied in this manner through a three-phase transformer, the distinction between star-connection and delta-connection disappears.

According to a preferred form of the invention, a differential voltage regulator has its input supplied from a three-phase supply and provides two three-phase output voltages which may vary oppositely in magnitude. The differential voltage regulator may be of any of the well-known forms. For example, it may be an induction regulator or it may be a variable transformer providing two oppositely variable voltages by means either of two sliding contacts, providing continuously-variable outputs, or by means or switched tappings, providing stepwise variation of outputs.

One output voltage energises the two coil groups of each phase winding in parallel and the other output voltage is supplied to the three-phase transformer primary. Adjustment of the induction regulator varies the amplitudes of the two output voltages in opposite senses. In a particularly advantageous form of the invention, the two outputs of the induction regulator are so related at all times that the sum of the two voltages, added in phase, is a constant.

In order that the invention may be carried into practical effect, the general principle thereof and a number of specific embodiments will now be described in detail, by way of examples, with reference to the accompanying drawings, of which.

In FIGS. 1(a), 2(a), 3(a) and 4(a) the three phase-windings of a three-phase induction motor are shown and indicated by similar reference numerals distinguished, for the three phase-windings, by no accent, one accent or double accents, respectively. Each phase-winding comprises a major part, wound in two similar halves and connected between outer terminals 11 and 12, a terminal 13 representing the junction of the two halves. A further phase-winding part, which is connected in circuit only in the unmodulated connection, is connected between terminal 13 and a further terminal 14.

Figures 1A, 1B:
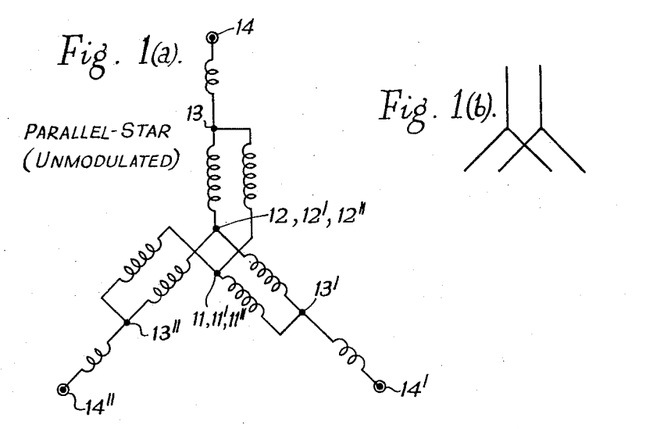
FIGS. 1(a) and 2(a) are circuit diagrams showing the three phase-windings of a three-phase induction motor in parallel-star (unmodulated) and series star (pole-amplitude modulated) connections respectively.
FIGS. 1(b) and 2(b) are the corresponding representative diagrams.

For the parallel-star (unmodulated) connection the terminals 11 and 12 of each phase-winding form the centre point of the star and may, if desired, all be connected together. The three phase supply voltage lines are then connected to the star points at terminals 14, 14' and 14".

Figures 2A, 2B:
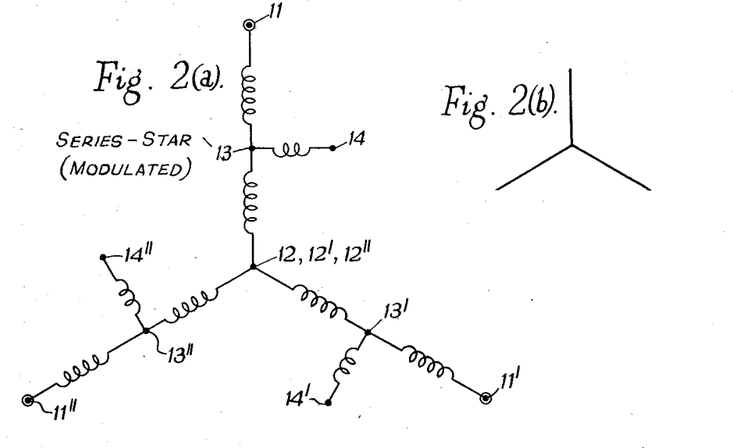

For the series-star connection of FIG. 2(a), the terminals 12, 12' and 12" are connected together and form the centre point of the star. The three phase supply lines are then connected to the star points at terminals 11, 11' and 11". The winding part between terminals 13 and 14 is then not energised.

Figures 4A, 4B:
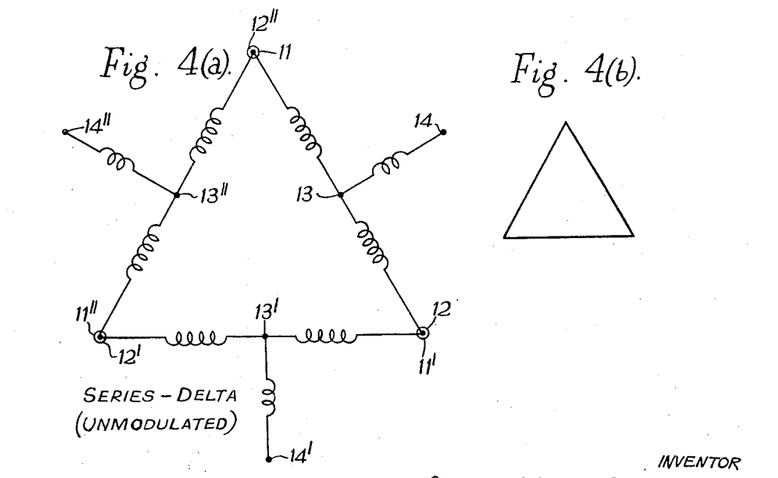

For the series-delta connection of FIG. 4(a), the terminals 11 of one-phase winding is connected to the terminal 12 of the next phase-winding. The three phase supply lines are then connected to the delta points corresponding to these junctions of consecutive phase-windings.

Reference is directed to FIGS. 6 to 9, described later herein, for the physical details of phase-windings exemplifying the application of phase-amplitude modulation.

It is sufficient for the full understanding of the present invention to accept that, where the examples of FIGS. 6 and 8 and FIGS. 1 and 2 are concerned, the parallel-star connection provides a machine wound and energised identically to a standard 8-pole or 4-pole induction motor, respectively, whereas the alternative series-star connection results in the reversal of current flow in one of the phase-winding halves, either between terminals 11 and 13 or terminals 12 and 13, together with the omission of the poles constituted by the coils in the phase-winding part between terminals 13 and 14.

Figure 7:
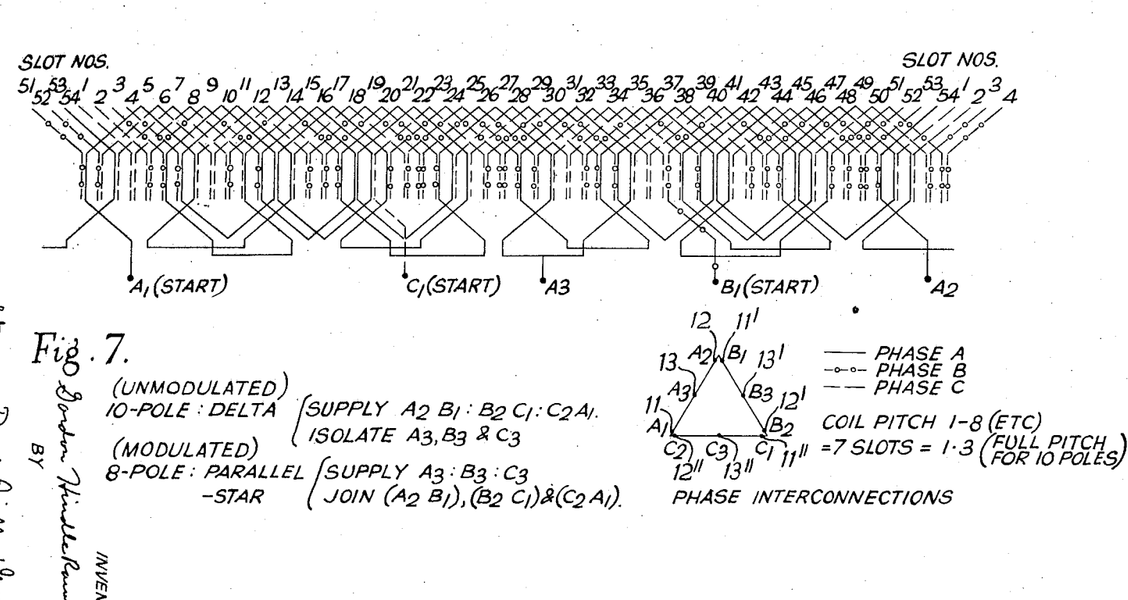
FIG. 7 is a slot winding diagram of a three-phase machine having three phase-windings for connection in the alternative ways shown in FIG. 4 and FIG. 3, to provide 10 poles unmodulated and 8 poles modulated.

In the machine of FIG. 7, an example has been given wherein the modulated connection is provided by a parallel-star arrangement of the phase-winding parts and the unmodulated connection by a series-delta arrangement.

The effect of this pole reversal, and coil-omission in the cases where this occurs, is to provide, for each phase, a mixed field corresponding to two pole-numbers, the one above the original (unmodulated) pole number and the other equally below the unmodulated pole-number. In the resultant three-phase field, due to the three phase-windings, one of the mixed fields has the three phase-components superimposed and is therefore suppressed. The field corresponding to the other pole-number of the mixed field remains and constitutes a three-phase field having the three phases spaced by 120° (electrical), as is required for the winding of an induction motor. In the modulated connection, therefore, a field corresponding to an alternative pole-number and providing an alternative running speed is provided with the same stator winding as is used for the original (unmodulated) pole-number and running speed.

Figure 9A:
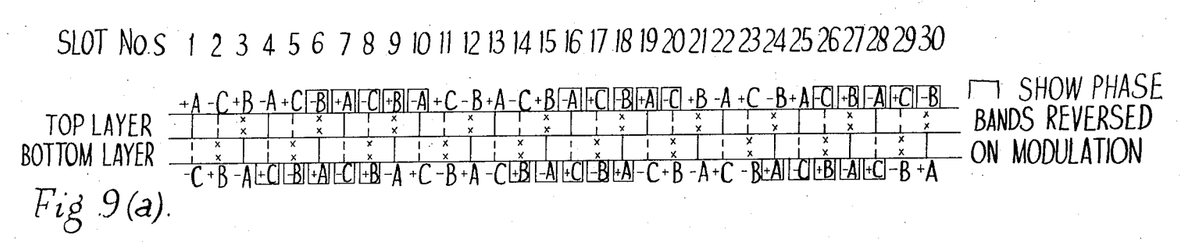
FIGS. 9(a) and 9(b) are slot winding diagrams of a three-phase machine having three phase-windings for connection in the alternative ways shown in FIG. 10 and FIG. 11, to provide 10 poles unmodulated and 4 poles modulated.
Figure 9B:
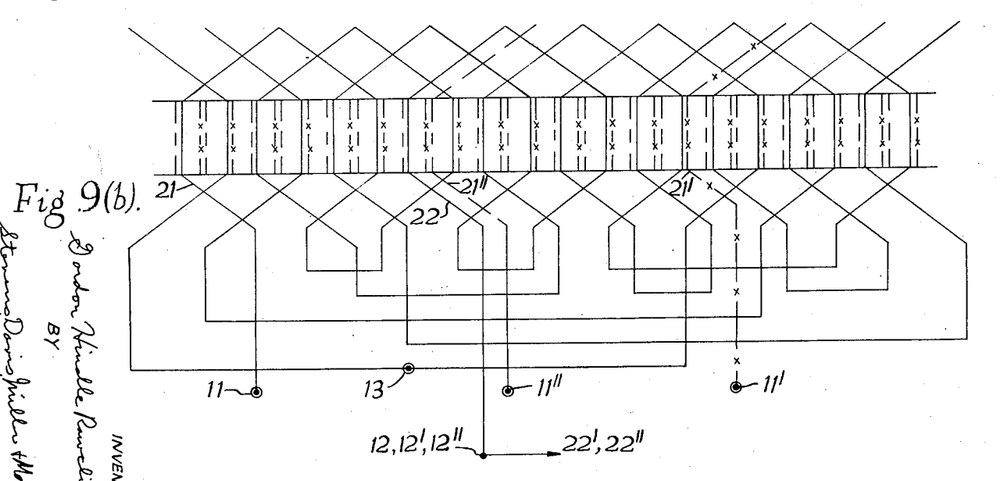

In the machine of FIG. 9, the unmodulated connection is provided by a series-star arrangement of the phase-winding parts and the modulated connection by a parallel-star arrangement. Moreover, the modulated arrangement is simplified in that no coils are omitted from circuit. In this case also, a mixed field of two pole-numbers is produced but the unwanted pole-number is eliminated by chording.

Although not specifically described herein, it should be understood that in the examples of FIGS. 6 and 8 and FIGS. 1 and 2 the series-star connection might be used for the unmodulated energisation of the primary winding and the parallel-star for the modulated connection. Similarly in the example of FIG. 7 and FIGS. 3 and 4, the series-delta connection might be used for the modulated connection and parallel-star for the unmodulated. This would merely require, in the windings of FIGS. 6 to 8, appropriate connection in sense of the coils of the two half-windings and pole omission by neutralisation instead of coil omission.

Correspondingly, for the machine of FIG. 9, the unmodulated condition might correspond to the parallel-star connection and the modulated condition to the series-star connection, merely by the reversal in sense of one of the phase-winding parts.

Figure 5:
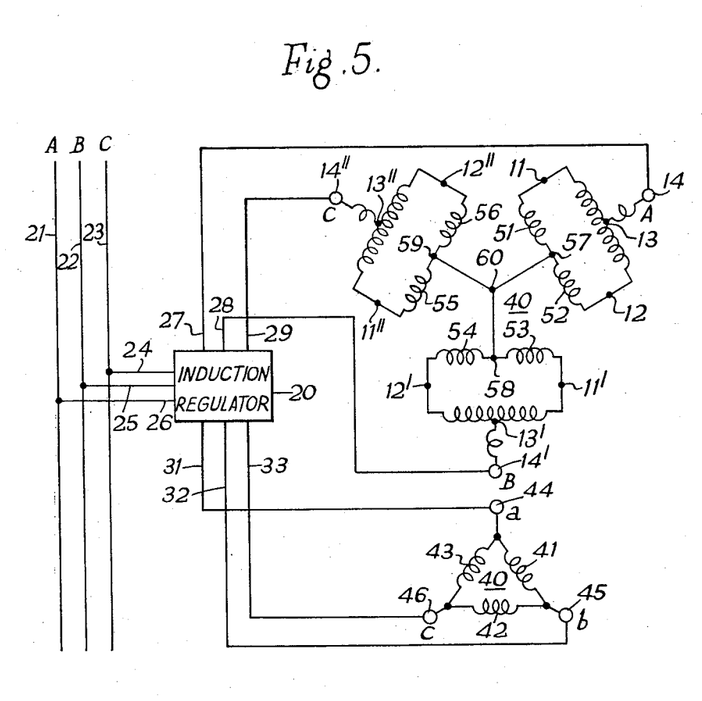
FIG. 5 is a schematic circuit diagram showing three phase-windings according to FIGS. 1(a) and 2(a) or FIGS. 3(a) and 4(a) in a supply circuit arrangement, according to the present invention.

Referring now to FIG. 5, in which corresponding parts are indicated by the same reference numerals as in FIGS. 1 to 4, the operation of the circuit arrangement will be immediately appreciated when it is understood that the three phase-windings are energised simultaneously in the two modes, one of which provides the unmodulated condition, and pole-number, and the other of which provides the modulated condition, and pole-number.

Figures 3A, 3B:
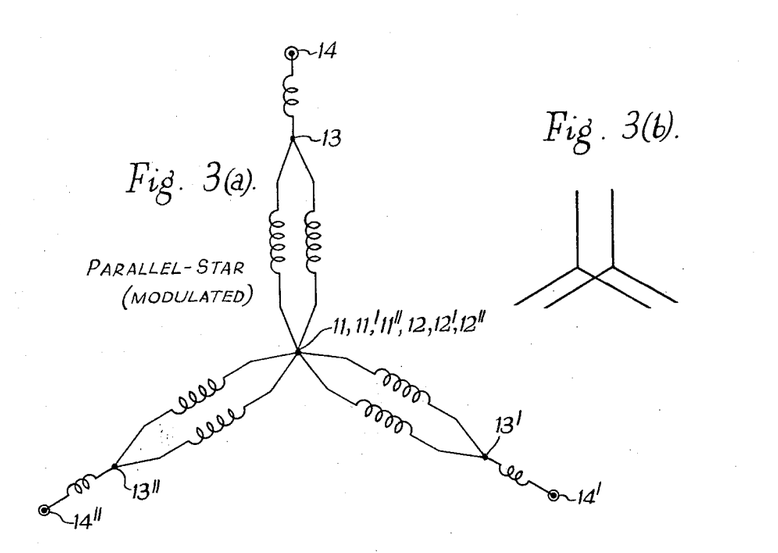
FIGS. 3(a) and 4(a) are diagrams showing corresponding three phase-windings in parallel-star (modulated) and series-delta (unmodulated) connections respectively.
FIGS. 3(b) and 4(b) are the corresponding representative diagrams.

The unmodulated condition, referring this example to the cases of FIGS. 1 to 4, is provided by supplying terminals 14, 14' and 14", as in FIGS. 1(a) and 3(a). The modulated condition is provided by supplying each phase-winding at its extremities, as in FIGS. 2(a) and 4(a). Instead of a direct connection from the supply lines, however, an intermediate three-phase transformer must be used.

If the energisation corresponding to one condition, say the unmodulated condition, is nil and the energisation corresponding to the other condition, the modulated condition in this case, is a maximum, then the motor runs at the speed corresponding to the modulated pole number.

If, on the contrary, the modulated energisation is nil and the unmodulated energisation is a maximum, the motor runs at the speed corresponding to the unmodulated pole number.

If the energisation of the primary winding corresponds partially to the modulated condition and partially to the unmodulated condition, the motor runs at a speed intermediate between the modulated and unmodulated speeds.

If, in the last case, the primary winding energisation corresponding to the modulated condition is progressively decreased and the energisation corresponding to the unmodulated condition is correspondingly increased, the motor speed is continuously changed in the sense of the unmodulated speed and vice versa.

Thus a motor is provided having continuous speed variation between two limiting speeds in close ratio, using a single primary winding.

Referring now in greater detail to FIG. 5, an induction regulator 20 has its input supplied from a three-phase supply at lines 21, 22 and 23 by connection 24, 25 and 26 thereto. One output voltage from the regulator 20 appears on lines 27, 28 and 29 and is supplied to the parallel-star points at terminals 14, 14′ and 14″ respectively. The other output voltage from the regulator 20 appears on lines 31, 32 and 33 and is supplied to the primary of a three-phase transformer indicated generally at 40. The transformer 40 has three primary windings 41, 42 and 43 connected in delta between terminals 44, 45, 46 to which the lines 31, 32, 33 are respectively connected. The transformer 40 has three centre-tapped secondary windings the first comprising the winding halves 51, 52 having a centre tap 57, the second comprising winding halves 53, 54 having a centre tap 58 and the third comprising winding halves 55, 56 having a centre tap 59. The winding halves 51, 52 are connected between terminals 11, 12, the winding halves 53, 54 between terminals 11′, 12′ and the winding halves 55, 56 between the terminals 11″, 12″. The centre taps 57, 58 and 59 are connected together at terminal 60.

For the parallel-star connection at terminals 14, 14′ and 14″ the transformer secondary winding halves 51, 52 in parallel 53, 54 in parallel and 55, 56 in parallel constitute a low-impedance connection from the terminal pairs 11, 12 of each phase-winding to the star centre point at terminal 60.

In the example given, the sum of the two outputs of the induction regulator 20 is a constant value so that, whatever the regulator setting, the primary winding of the motor is always fully energised, by the combination of the two modes of energisation.

Figure 6:
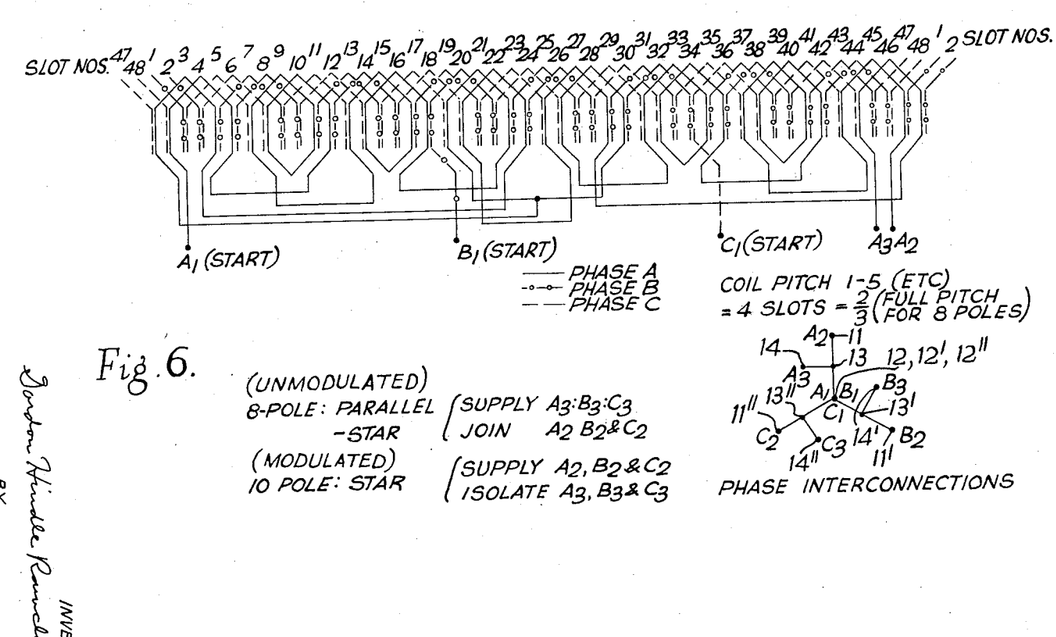
FIG. 6 is a slot winding diagram of a three-phase machine having three phase-windings for connection in the alternative ways shown in FIG. 1 and FIG. 2 to provide 8 poles unmodulated and 10 poles modulated.

FIG. 6 shows a machine having three phase-windings, each providing 8 poles unmodulated, wound on a 48 slot stator. In the modulated condition, the three phase-windings separately provide a mixed 6-pole, and 10-pole field. The phase-winding spacings are so chosen that the 6-pole fields are cancelled out in the three-phase field and the 10-pole field is the operative modulated condition.

The key to the phase interconnections shows not only the phases of the various phase-windings but also the terminal connections of the phase-winding parts corresponding to FIGS. 1(a) and 2(a).

The three phase-windings are connected in parallel-star as shown in FIG. 1(a) for the unmodulated condition and in series-star, as shown in FIG. 2(a), for the modulated condition.

The spacing between phases in sixteen slots which corresponds to 120° mechanically around the stator axis. This spacing results in the superimposition, and hence cancellation, of the three 6-pole field components, while leaving the 10-pole field components spaced at 120° electrical, as required for a three-phase field.

In FIG. 7, the machine comprises three phase-windings wound on a 54-slot stator. Each phase-winding is a fractional-slot winding providing a coil group per phase of:

+1+2+3+2+1     +1+2+3+2+1  (unmodulated)

and

+1+2+3+2+1     −1−2−3−2−1  (modulated)

The key to the phase interconnections shows also the terminal connections of the phase-winding parts corresponding to FIGS. 3(a) and 4(a).

The three phase-windings are connected in delta, as shown in FIG. 4(a) in the unmodulated condition to provide a 10-pole field and in parallel-star, as shown in FIG. 3(a) in the modulated condition to provide an 8-pole field.

Figure 8:
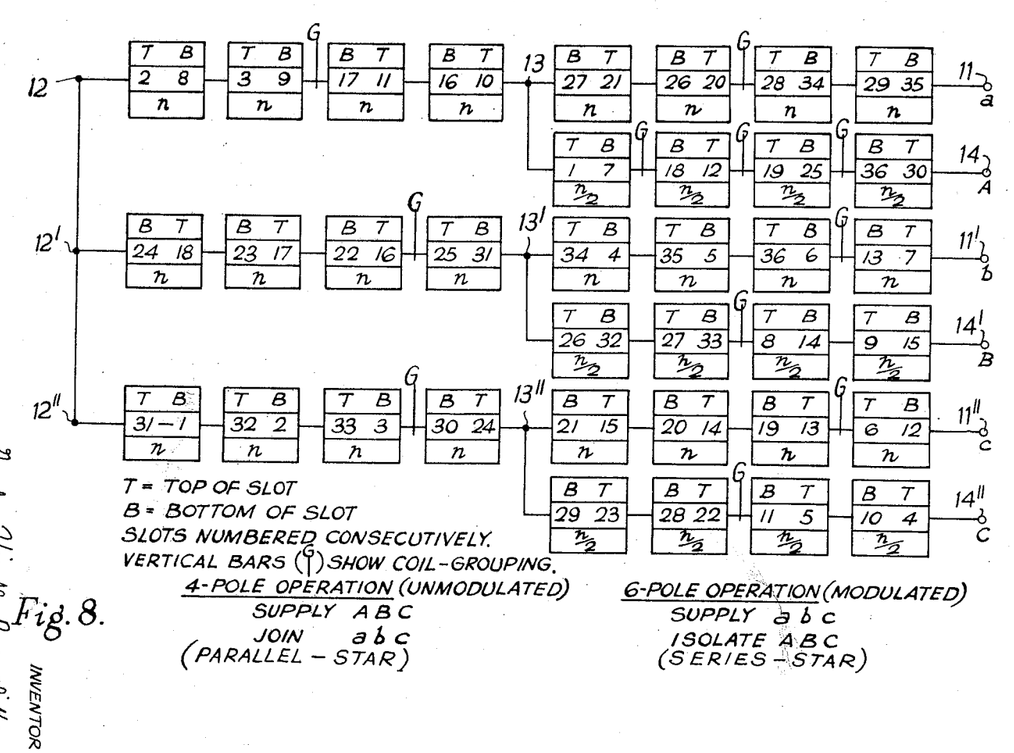
FIG. 8 is a winding diagram of a three-phase machine having three phase-windings for connection in the alternative ways shown in FIG. 1 and FIG. 2 to provide 4 poles unmodulated and 6 poles modulated. In this figure a different schematic connection is used for the purpose of showing, in addition to the slot number of each coil, the position (top or bottom) in the slot and relative number of turns.

In the machine of FIG. 8, the three phase-windings are wound on a 36-slot stator. Each of the three phase-windings is arranged in three parts, as shown in FIGS. 1(a) and 2(a). Two parts are series connected between terminals 11, 13, 12 and the coils of these two parts each contain a given number of turns $n$. The third part is connected between terminals 14, 13 and each coil thereof has $$\left(\frac{n}{2}\right)$$

turns of wire of twice the cross sectional area.

In the unmodulated, 4-pole connection, the phase-winding parts are connected in a parallel-star arrangement, as shown in FIG. 1(a). In the modulated, 6-pole connection, the phase-winding parts are connected in a series-star arrangement, as shown in FIG. 2(a).

Referring again to FIG. 5, the arrangement there shown for the energisation of the phase-windings simultaneously in the unmodulated and in the modulated condition may now be related to the slot winding diagrams of FIGS. 6 to 8, as it was previously to the circuit diagrams of FIGS. 1 to 4.

The machine of FIG. 9 differs from those of FIGS. 6 to 8, in that it provides two pole numbers, in the unmodulated and modulated conditions, which are in wide ratio, namely 10:4, instead of the close ratios of the machines of FIGS. 6 to 8.

The machine of FIGS. 9(a) and 9(b) has three phase-windings wound on a 30-slot stator. All three-phase windings and the positions of the coil runs thereof in the slots, whether at top or bottom of the slot, are shown in FIG. 9(a). For clarity, only one phase-winding is shown in full in FIG. 9(b). The other two phase-windings, being exactly similar, but spaced by 10 slots, which is one third of the perimeter, may be followed from that shown.

Figure 10:
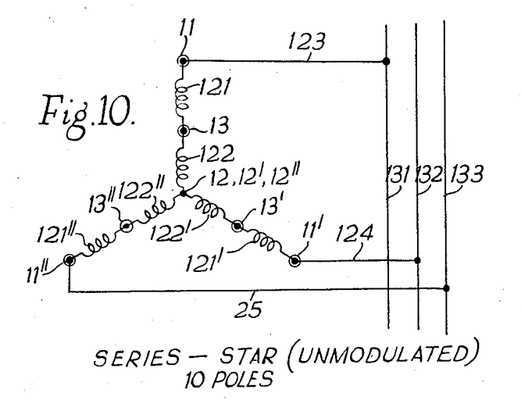
Figure 11:
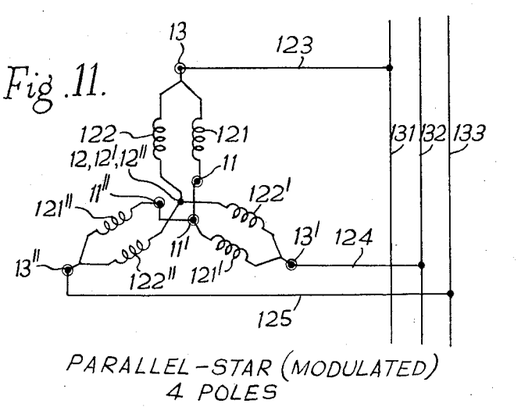

The references to the phase-winding parts correspond to those of FIGS. 10 and 11. The terminal references correspond to FIGS. 10 and 11 and, generally, to FIGS. 1(a) and 2(a) also. However, it will be noted that there is no branch phase-winding part and hence no terminals 14.

In the unmodulated, 10-pole condition, the phase-winding parts 121, 122 and so on, are connected in a series-star arrangement, as shown in FIG. 10. The three phase-windings, so arranged, are supplied by leads 123, 124 and 125 from a three-phase supply 131, 132 and 133.

In the modulated, 4-pole condition, the phase winding parts 121, 122 and so on are connected in a parallel-star arrangement, as shown in FIG. 11. The three phase-windings, so arranged, are supplied by leads 123, 124 and 125 from the three-phase supply 131, 132 and 133.

Relating now the circuit arrangement of FIG. 5 to the machine of FIG. 9, it will be apparent, from a comparison of FIG. 1(a) or FIG. 3(a) with FIG. 11 that the phase winding part between terminals, 13, 14 is omitted and that the supply must be connected directly to terminal 13.

Hence, in FIG. 5, the terminals 14, 14′ and 14″ are directly connected to the terminals 13, 13′ and 13″ of the machine of FIG. 9.

In considering the examples described with reference to FIGS. 6 to 9 in the circuit of FIG. 5, it should be recognised that any method of squirrel-cage induction-motor speed control which involves running at a speed other than near synchronism results in rotor power losses. This, however, is not unacceptable, having regard to the continuously variable control of speed obtained by the circuit of FIG. 5. In such a case it may be desirable to provide internal forced ventilation of the motor.

The power loss depends directly on the extent of departure from synchronous speed, that is on the "slip." The machines of FIGS. 6, 7 and 8 differ by only 2 poles as regards their alternative pole numbers. These machines particularly those of FIGS. 6 and 7, thus permit the advantages of speed control to be achieved with small power losses, since the mean speed is not greatly different from either synchronous speed.

With the machine of FIG. 9, however, an alternative advantage is available. With a close-ratio speed-changing motor, the motor is likely to be run at or near the mean speed. At the mean speed, the driving torque is considerably less than at either of the limiting synchronous speeds. With a wide-ratio speed-changing motor however, a small part of the full possible variable speed range can usually be chosen as the working range. If the working speed range can be placed so as to include one of the synchronous speeds, the requirements of limited "slip" and well-maintained torque over the speed range are both satisfied.

A further development of the circuit arrangement of FIG. 5 is possible. In the foregoing description, it is implied that the induction regulator 20 is set manually to give the required motor running speed. By applying control-methods well-known in the art, the adjustment of the regulator 20 may be adjusted automatically in the sense to increase or decrease motor speed, as load is imposed or removed respectively. By such means, the motor speed can be maintained constant automatically with varying motor load.

What I claim is:

1. A control circuit arrangement for controlling the speed of a three-phase, squirrel case, pole-changing, induction motor, said motor having three phase-windings for providing a first pole-number when energised in a first manner and for providing a second pole-number by pole-amplitude modulation when energised in a second manner, at least the major part of each of said three phase-windings comprising two groups of series-connected coils connected from separate end terminals to a common mid terminal, said first and second manners of energisation comprising series-connection and parallel-connection respectively of said two groups of coils of each phase-winding, supply connections from a first three-phase supply to said mid terminals of the three phase-windings, supply connections from a second three-phase supply to said end terminals of the three phase-windings and control means for simultaneously and oppositely varying the amplitudes of first and second three-phase supplies.

2. A control circuit arrangement as claimed in claim 1, in which said supply connections from said first three-phase supply includes coils of the three phase-windings not included in said two series-connected groups.

3. A control circuit arrangement as claimed in claim 1, in which said supply connections from said second three-phase supply includes a three-phase transformer.

4. A control circuit arrangement as claimed in claim 3, in which said three-phase transformer has three secondary windings, each secondary winding being connected to said end terminals of one phase-winding.

5. A control circuit arrangement as claimed in claim 4, in which said three secondary-windings are centre-tapped, said centre taps being connected together to provide a centre-point of a parallel-star connection of said phase-windings.

6. A control circuit arrangement as claimed in claim 5, in which both said first and said second three-phase supplies are derived from the outputs of a three-phase induction regulator said regulator serving as said control means.

7. A control circuit arrangement as claimed in claim 6, in which the outputs of the three-phase induction regulator are so related at all times that the sum of their amplitudes, added in phase, is a constant.

8. A control circuit arrangement as claimed in claim 1, in which both said first and said second three-phase supplies are derived from the outputs of a three-phase induction regulator, said regulator serving as said control means.

No references cited.